US009358962B2

(12) United States Patent
Zambou (10) Patent No.: US 9,358,962 B2
(45) Date of Patent: Jun. 7, 2016

(54) METHOD AND SYSTEM FOR ADAPTIVELY CONTROLLING DISTANCE AND SPEED AND FOR STOPPING A MOTOR VEHICLE, AND A MOTOR VEHICLE WHICH WORKS WITH SAME (75) Inventor: Nathan Zambou, Rosbach v. d. Höhe (DE)

(73) Assignee: Continental Teves AG & Co. oHG (DE)

( * ) Notice: Subject to any disclaimer, the term of this patent is extended or adjusted under 35 U.S.C. 154(b) by 0 days.

(21) Appl. No.: 14/236,648

(22) PCT Filed: Aug. 3, 2012

(86) PCT No.: PCT/EP2012/065259
§ 371 (c)(1),
(2), (4) Date: Apr. 22, 2014

(87) PCT Pub. No.: WO2013/017688
PCT Pub. Date: Feb. 7, 2013

(65) Prior Publication Data
US 2014/0277990 A1 Sep. 18, 2014

(30) Foreign Application Priority Data
Aug. 3, 2011 (DE) .......................... 10 2011 109 204

(51) Int. Cl.
B60T 7/12 (2006.01)
B60K 31/00 (2006.01)
(Continued)

(52) U.S. Cl.
CPC ............... *B60T 7/12* (2013.01); *B60K 31/0008* (2013.01); *B60W 10/184* (2013.01); *B60W 30/165* (2013.01); *B60W 30/17* (2013.01); *B60K 2310/30* (2013.01)

(58) Field of Classification Search
USPC .......................................... 701/96
See application file for complete search history.

(56) References Cited

U.S. PATENT DOCUMENTS 5,166,881 A 11/1992 Akasu
6,868,323 B2 3/2005 Kichima et al.
(Continued)

FOREIGN PATENT DOCUMENTS

DE 4100993 A1 7/1991
DE 10047048 A1 4/2002
(Continued)

OTHER PUBLICATIONS

German Search Report corresponding to Application DE 10 2012 213 815.3 dated Sep. 2, 2013.
(Continued)

*Primary Examiner* — Hussein A. Elchanti
(74) *Attorney, Agent, or Firm* — RatnerPrestia (57) ABSTRACT A method for stopping a motor vehicle, having an electronic environmental control device for evaluating the data of one or more environmental sensors, and an electronic braking control device for actuating a braking system, these exchanging information and/or instructions via a data bus. The method comprises: acquiring a distance to a vehicle travelling ahead; determining the motor vehicle travel speed; controlling the distance to the obstacle using the environmental control device if the travel speed exceeds a transfer threshold value; and stopping the motor vehicle using the braking control device if the travel speed is less than or equal to said transfer threshold value. Depending on the acquired distance, the environmental control device determines a target path for the braking control device at the end of which the motor vehicle should be stationary. The invention also relates to an electronic control device for a braking system, and a motor vehicle.

15 Claims, 6 Drawing Sheets

3 — Long-range sensor
2 — Short-range sensor
4 — Rotation-direction-detecting sensor (51) Int. Cl.
*B60W 10/184* (2012.01)
*B60W 30/165* (2012.01)
*B60W 30/17* (2012.01)

(56) References Cited

U.S. PATENT DOCUMENTS

| | | | |
|---|---|---|---|
| 8,755,982 | B2* | 6/2014 | Heckel et al. .................. 701/70 |
| 2010/0020170 | A1* | 1/2010 | Higgins-Luthman B60Q 1/1423 348/135 |
| 2010/0152963 | A1 | 6/2010 | Heckel et al. |
| 2010/0204897 | A1* | 8/2010 | Labuhn ................ B60W 30/16 701/93 |
| 2014/0333467 | A1* | 11/2014 | Inomata ......................... 342/27 |
| 2015/0066323 | A1* | 3/2015 | Ouchi ............................. 701/70 |

FOREIGN PATENT DOCUMENTS

| | | |
|---|---|---|
| DE | 10232950 A1 | 3/2003 |
| DE | 102006035371 A1 | 5/2007 |
| DE | 102007036787 A1 | 2/2009 |

OTHER PUBLICATIONS

International Search Report for International PCT Application No. PCT/EP2012/065259 dated Oct. 23, 2012.

* cited by examiner

Fig. 1

3 — Long-range sensor
2 — Short-range sensor
4 — Rotation-direction-detecting sensor

METHOD AND SYSTEM FOR ADAPTIVELY CONTROLLING DISTANCE AND SPEED AND FOR STOPPING A MOTOR VEHICLE, AND A MOTOR VEHICLE WHICH WORKS WITH SAME

CROSS REFERENCE TO RELATED APPLICATIONS

This application is the U.S. National Phase Application of PCT/EP2012/065259, filed Aug. 3, 2012, which claims priority to German Patent Application No. 10 2011 109 204.1, filed Aug. 3, 2011, the contents of such applications being incorporated by reference herein.

FIELD OF THE INVENTION

The invention relates to a method for stopping a motor vehicle which has an electronic surroundings control unit for evaluating the data from one or more surroundings sensors and which has an electronic brake control unit for activating a brake system, which electronics surroundings control unit and electronic brake control unit exchange information and/or commands via a data connection, in particular a vehicle data bus, toan electronic control unit of a brake system for a motor vehicle, comprising an interface to a vehicle data bus, an interface to at least one wheel rotational speed sensor, and means for driver-independent activation of at least one brake actuator, and to a motor vehicle equipped with a corresponding control unit.

BACKGROUND OF THE INVENTION

Modern motor vehicles are increasingly being equipped with functions such as Adaptive Cruise Control (hereinafter referred to as ACC) which make it possible for the speed of the vehicle to be regulated to a target speed predefined by the vehicle driver and/or adapted to the speed of the vehicle traveling ahead. Corresponding regulation systems are known for example from EP 1245428 A2, which is incorporated by reference. Said functions or regulation systems are realized by virtue of vehicles being equipped with at least one long-range sensor, such as a radar or lidar sensor, in order to measure the separation distance to a vehicle traveling ahead or to a nearby obstruction and automatically regulate said separation distance to a predefined, preferably speed-dependent target separation distance. Owing to the configuration of the regulation systems, the automatic separation-distance regulation can usually be activated only above a certain minimum vehicle speed.

Extended functionality is afforded by ACC systems with a stop-and-go function which, when required, automatically brake the vehicle to a standstill, or stop the vehicle, within a predefined time, for example in order to prevent a collision with the vehicle traveling ahead when arriving at the tail end of a traffic jam. Automatic restarting is also possible when there is an adequate separation distance to the vehicle traveling ahead and, expediently, further preconditions are met such as the exceedance of a minimum standstill time or the confirmation of a starting request by the vehicle driver. A confirmation by actuation of the accelerator pedal is disclosed for example in EP 1442917 A2, which is incorporated by reference. In the case of the stop-and-go function, the one or more long-range sensors are combined with one or more short-range sensors, preferably with multiple ultrasound sensors, in order to measure the remote and close regions in front of the vehicle.

For example, EP 2152538 B1, which is incorporated by reference, discloses a device and a method for controlling the following separation distance. The vehicle speed and a following separation distance between a vehicle traveling ahead and the subject vehicle are measured. A demanded acceleration is thereupon calculated and transmitted to a control device which controls the following separation distance to the vehicle traveling ahead on the basis of the demanded acceleration. If the vehicle traveling ahead stops, a stopping controller is activated. Here, a standstill state of the subject vehicle is identified on the basis of the demanded acceleration and a real vehicle speed which, using conventional sensors, can no longer be distinguished from zero; this ensures a smooth stopping process.

In the case of the known ACC systems with stop-and-go function, the automatic braking of the vehicle to a standstill takes place within a defined time period, wherein, for safety reasons, the stopping process is completed with a predetermined safe separation distance of typically 5 m to the vehicle in front. This has the advantage that the restart requires only relatively low dynamics. Said systems are suitable in particular for journeys on a highway or freeway, because on these roads, maintaining a large separation distance to the vehicle traveling ahead is mandatory. By contrast, in the case of inner-city journeys or for example in traffic jam situations on highways, the maintained safe separation distance to the vehicle in front constitutes a potential hazard because other vehicles from the adjacent lanes may cut into the gap.

EP 2176109 B1, which is incorporated by reference, discloses a separation-distance regulation system with automatic stopping and/or starting function for motor vehicles, having a separation-distance-measuring long-range sensor, a separation-distance-measuring ultrasound sensor, and a control unit which is designed to intervene in the longitudinal control of the subject vehicle as a function of the separation distance, measured by the long-range sensor, to a vehicle traveling ahead. If the measured separation distance is less than the range of the ultrasound sensor, the functionality of the ultrasound sensor is verified, whereupon separation-distance regulation is performed, within the context of the stopping and/or starting function, on the basis of the signal of the ultrasound sensor.

SUMMARY OF THE INVENTION

An aspect of the present invention permits safe and comfortable stopping of a vehicle with a predefined short separation distance to an obstruction situated ahead.

What is provided, therefore, is a method for stopping a motor vehicle which has an electronic surroundings control unit for evaluating the data from one or more surroundings sensors and which has an electronic brake control unit for activating a brake system, which electronics surroundings control unit and electronic brake control unit exchange information and/or commands via a data connection, in particular a vehicle data bus. Within the context of the method according to the invention, the separation distance to an obstruction, in particular to a vehicle traveling ahead, is measured and the traveling speed of the motor vehicle is determined. Here, regulation of the separation distance to the obstruction is performed by means of the surroundings control unit if the traveling speed exceeds a handover threshold value, and stopping of the motor vehicle is performed by means of the brake control unit if the traveling speed is less than or equal to the handover threshold value. As a function of the measured separation distance, the surroundings control unit predefines for the brake control unit a target distance at the end of which the vehicle should be stationary.

The stopping of a vehicle equipped with an ACC system within a predefined target distance or on a predefined target trajectory, or by a predefined distance point in the low speed range, that is to say from a low initial speed down to standstill, is thus realized in a targeted and comfortable manner. Owing to the predefined target distance, the method according to the invention makes it possible for the limited available in a traffic jam situation to be well utilized and for the traffic flow in city traffic, which is influenced by the length of the green phases of traffic signals, to be improved by virtue of the separation distance, when stopped, to the vehicle in front being shortened in standstill traffic. By virtue of the fact that, in the stopping distance regulation, the distance covered by the motor vehicle before it reaches a standstill and not the separation distance to the adjacent vehicle or obstruction is regulated and stopping within a target time period is dispensed with, it is possible for particularly comfortable regulation to be provided. Here, use is made of the sensor means and actuator means that are required in any case for an ACC system with stop-and-go function.

It is expedient for the brake control unit, during the stopping process, to regulate the deceleration and/or the traveling speed of the vehicle as a function of the traveling distance covered. It is particularly expediently provided that the brake control unit is connected to at least one wheel rotational speed sensor, and that, as a measure of the traveling distance covered, pulse-like signals from the at least one wheel rotational speed sensor are counted. Since, advantageously, the regulation is performed only by means of braking interventions and the drive torque is kept at a constant value of zero, this results in conceptually simple regulation with high regulation accuracy.

It is preferable for the relationship between deceleration and/or traveling speed and the traveling distance covered to be regulated on the basis of a predefined mathematical function, in particular a third-order to eighth-order polynomial. A main concept of the invention thus consists in realizing the stopping or the stopping process on the basis of the target distance, and ensuring the comfort—even upon the transition from the separation-distance regulation by the surroundings control unit to the stopping regulation by the brake control unit—with the aid of a distance-dependent mathematical function.

It is particularly preferable for the predefined mathematical function to be selected as a function of the traveling speed and a predefined target distance at the time of the handover from the first control unit to the second control unit. A suitable stopping trajectory, or one or more parameters of the stopping distance regulator and/or of the pilot controller, can be determined and/or adapted on the basis of these boundary conditions.

Is very particularly preferable for the predefined mathematical function to be selected such that the relationship $2v^2+3xa \geq 0$ between traveling speed v and traveling distance covered x is satisfied, wherein a represents the deceleration, that is to say the change in the vehicle speed with respect to time.

It is advantageous if, during the stopping of the motor vehicle by means of the brake control unit, a measurement of the separation distance to the obstruction is performed by the surroundings control unit, in particular at predefined time intervals, wherein the predefined target distance is adapted as a function of the measured separation distance. By virtue of the fact that the surroundings control unit constantly or periodically transmits updated values for the target distance to the brake control unit during the stopping process, the stopping trajectory can be adapted to the behavior of the vehicle traveling ahead. It is thus possible, with regard to the vehicle in front, to identify if, for example, said vehicle rolls forward slightly at a traffic signal. Furthermore, it is expedient for the target distance to be defined and/or adapted as a function of the present driving situation (such as, for example, heavy inner-city traffic at rush hour) and prevailing environmental conditions (such as, for example, rain).

It is particularly advantageous for the stopping process to be terminated if a restart of the vehicle traveling ahead is identified, in particular if the separation distance has increased by more than a predefined minimum separation distance in a time interval, and for separation-distance regulation to be performed in this case by the surroundings control unit. If the speed of the vehicle traveling ahead exceeds a restart threshold value and/or if it can be inferred from other information that, for example, a traffic signal is green, a smooth resumption of separation-distance and/or speed regulation is possible.

If the motor vehicle has a hydraulic service brake system and an electrically actuable parking brake system, it is expediently provided that a handover from the service brake system to the parking brake system is performed if predefined conditions are met, in particular if a predefined stoppage duration is exceeded. This conserves the service brake system and furthermore secures the vehicle so as to prevent it from inadvertently rolling away.

The invention also relates to an electronic control unit of a brake system for a motor vehicle, comprising an interface to a vehicle data bus, an interface to at least one wheel rotational speed sensor, and means for driver-independent activation of at least one brake actuator. According to the invention, the brake control unit comprises a stopping distance regulator which adjusts the deceleration and/or the speed of the motor vehicle as a function of the traveling distance covered in order to stop the motor vehicle within a predefined target distance.

The stopping distance regulator preferably comprises a pilot controller, a main regulator and in particular an extended regulator, wherein at least one parameter of the stopping distance regulator is predefined as a function of the present speed of the vehicle and the predefined target distance. It is thus possible for the pilot controller and/or the main regulator to be adapted in order to permit a particular a high level of comfort in the prevailing travel situation.

The at least one parameter is expediently predefined on the basis of a predefined mathematical function that describes the target relationship between deceleration and/or vehicle speed and the traveling distance covered.

The invention also relates to a motor vehicle, comprising an electronic brake control unit according to the invention, comprising a hydraulic and/or electromechanical brake system which is connected to the brake control unit and which permits a build-up of braking force independently of a driver, and comprising an electronic surroundings control unit which is equipped with at least one forward-facing surroundings sensor. By virtue of the fact that the brake control unit and the surroundings control unit are connected to one another via a vehicle data bus, said control units are capable of braking the vehicle in accordance with the method according to the invention.

It is advantageous if the brake control unit is connected to at least one rotation-direction-detecting wheel rotational speed sensor which is assigned in particular to a non-driven wheel. Conventional methods for detecting the direction of travel can be unreliable at low speeds.

Is particular advantageous for the motor vehicle to also have an electronic parking control unit which is equipped in each case with at least one forward-facing and at least one rearward-facing surroundings sensor, wherein the parking control unit is connected to the brake control unit and preferably to the surroundings control unit via a vehicle data bus, and wherein the parking control unit and/or the surroundings control unit can predefine for the brake control unit a target distance for the stopping of the vehicle. The stopping distance regulation according to the invention thus permits comfortable stopping even during parking of the motor vehicle.

BRIEF DESCRIPTION OF THE DRAWINGS

Further preferred embodiments will emerge from the subclaims and from the following description of an exemplary embodiment on the basis of figures, in which:

DETAILED DESCRIPTION

The method according to the invention realizes comfortable and targeted regulation of the stopping process of a vehicle within a predefined target distance or by a predefined distance point in the range of low vehicle speeds. The method is preferably used not only as an enhancement of the separation-distance regulation system but also to supplement or support the parking steering assistance system (referred to hereinafter as PLA).

Here, an ACC system with stop-and-go function or stopping option is enhanced or designed such that, in the low speed range, that is to say below a handover threshold value of for example 30 km/h, the ACC function does not initiate stopping within a defined time period but rather predefines a target distance for the stopping process, which makes it possible to realize a shorter separation distance, when stopped, to the directly adjacent vehicle or obstruction.

The automatic stopping, while adhering to the target distance predefined by the ACC function, is implemented by a stopping distance regulation system or by Stopping Distance Control (hereinafter referred to as SDC function). The range of application of said SDC function is limited to speeds below a predefined vehicle speed, wherein there is an overlap between the speed ranges in which the ACC function and the SDC function respectively are, in principle, functional, and the selection of the respectively active function is performed on the basis of a handover threshold value of the measured vehicle speed.

It is also expedient for the speed range of the SDC function to be defined such that it also extends the functionality of a parking steering assistance system (referred to hereinafter as PLA) which brakes the vehicle to a standstill along a predefined path and which is known for example from EP 1908656 A1. Comfortable, jerk-free parking is made possible by means of the method according to the invention.

Figure 1:
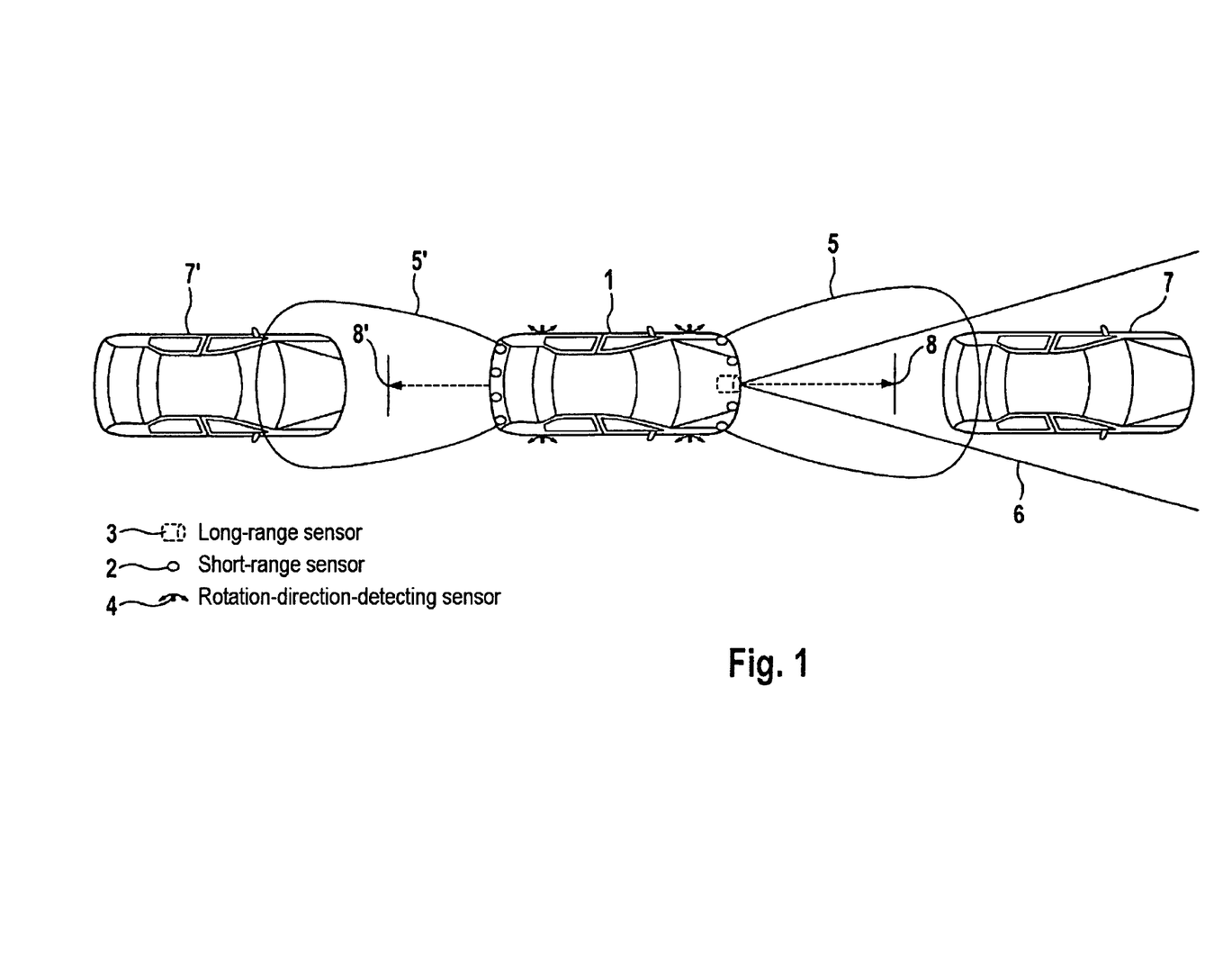
FIG. 1 is a schematic illustration of a motor vehicle in a corresponding driving situation.

FIG. 1 is a schematic illustration of a motor vehicle 1 which has the sensors required for the method according to the invention or for the realization of the SDC function. Here, the surroundings sensor means comprises a long-range sensor 3 which measures the remote region 6 ahead of the vehicle and which is used for example for an ACC function. Furthermore, the vehicle 1 has multiple short-range sensors 2 which both detect obstructions 7 situated in the close region 8 ahead of the vehicle, and also other vehicles or obstructions 7' situated in the close region 8' to the rear, and determine the respective separation distance to the vehicle. Furthermore, the motor vehicle 1 has rotation-direction-detecting (wheel rotational-speed) sensors 4 which are preferably installed at the wheels of the free-rolling axle or at all of the wheels. By means of the rotation-direction-detecting sensors 4, the direction of the vehicle movement is identified unequivocally, whereby the regulation rules of the SDC function—in particular with regard to comfort and safety—can be adapted, and optimum regulation is performed both in the ACC mode and also in the PLA mode.

In the prior art, ACC systems utilize both the drive, typically an internal combustion engine, and the brake system as actuator means for regulating the separation distance to the vehicle traveling ahead. Here, the control unit that provides the ACC function transmits a control demand via a data bus. Since the two actuators, engine and brakes, are operated by the two different control units, two separate commands are thus output here. Since a constantly alternating activation of the two actuators (which is possible in principle) has an adverse effect on comfort, it is preferable for only one actuator to be used to realize the SDC function. Here, only the brake system is activated in order to bring the motor vehicle to a standstill from a moving state (non-zero initial speed).

Figure 2:
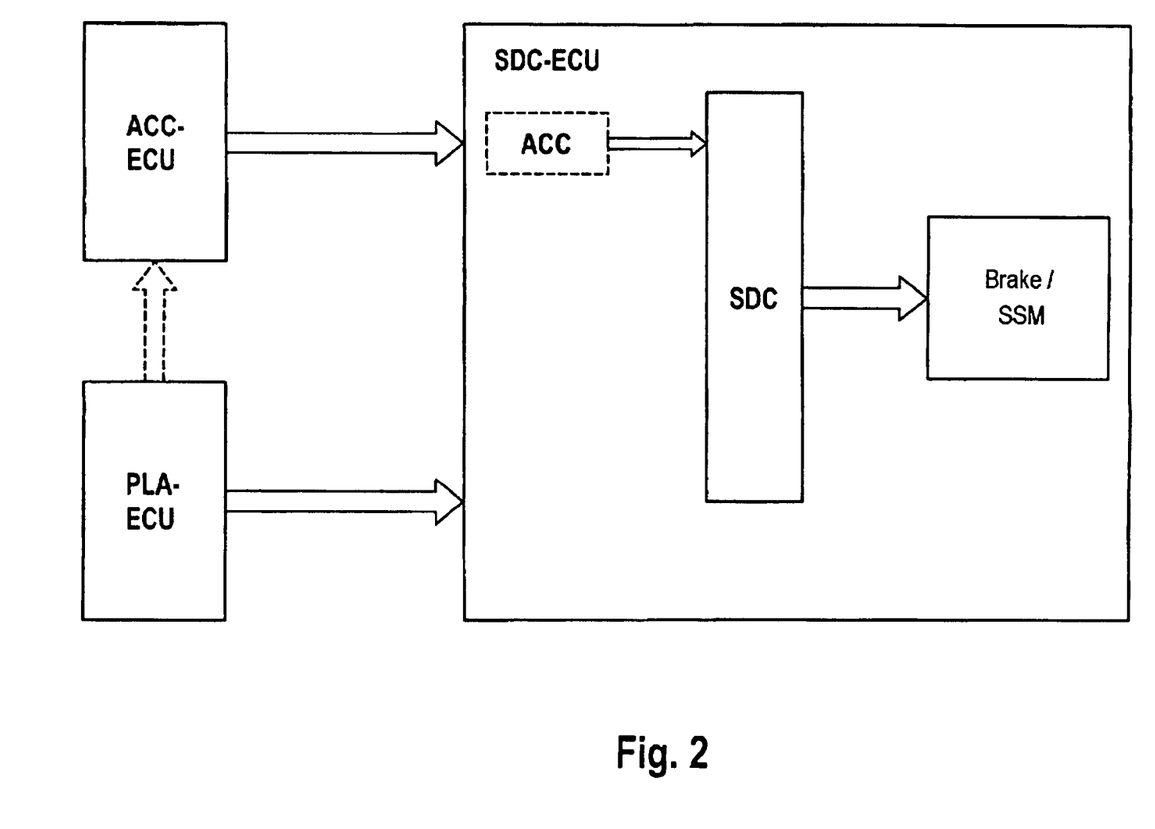
FIG. 2 shows an exemplary diagram of the control unit.

FIG. 2 shows an exemplary diagram of a control unit, that is to say a schematic illustration of the architecture between the control units (hereinafter referred to as ECUs) for the realization of the SDC function.

The separation-distance regulation or ACC function is provided by the surroundings control unit ACC-ECU which, via a vehicle data bus, transmits information and/or commands, in particular a deceleration or braking torque demand, to the brake control unit SDC-ECU. The ACC-ECU is connected to at least one long-range surroundings sensor.

The brake control unit preferably comprises a special ACC module which realizes the communication with the ACC-ECU and the engine control unit. The stopping distance regulator is realized in the SDC module of the brake control unit SDC-ECU. Said stopping distance regulator outputs a braking demand which, in the case of a hydraulic brake system, is implemented in the form of a driver-independent build-up of pressure for example by means of a hydraulic pump, and thus an increased brake pressure in the wheel brakes. The implementation of the braking demand may correspondingly also be realized by means of electromechanical friction brakes. It is advantageously provided that, even in the case of a vehicle with at least intermittently electric drive, a braking demand of the SDC module is always implemented by means of friction brakes. This prevents inadvertent rolling of the vehicle owing to a diminishing braking action of a generator at low speed. It is advantageous for a standstill manager SSM to be realized as a module in the brake control unit, which standstill manager firstly suitably implements the braking demand and secondly secures the vehicle, so as to prevent it from rolling away, after the stopping process. Here, a handover to an electric parking brake may also be performed.

The PLA system is expediently realized in a separate PLA-ECU which is connected to multiple surroundings sensors for measuring the close region ahead of and behind the motor vehicle. The PLA-ECU can transmit information and/or commands via a vehicle data bus to the SDC-ECU and preferably also to the ACC-ECU. In principle, it is also conceivable to use one control unit both for the ACC function and for the PLA function.

The SDC function regulates the stopping trajectory such that the vehicle comes to a standstill (that is to say reaches a speed of 0 km/h) precisely at the end of the target distance and the stopping process is comfortable for the vehicle driver and the occupants, that is to say sudden, jerk-inducing brake pressure changes in the wheel brakes are avoided. To ensure this, a regulation structure is defined which makes it possible to simultaneously pursue two goals, specifically both the reference variable regulation or target distance regulation and also the setting of the comfort.

Figure 3:
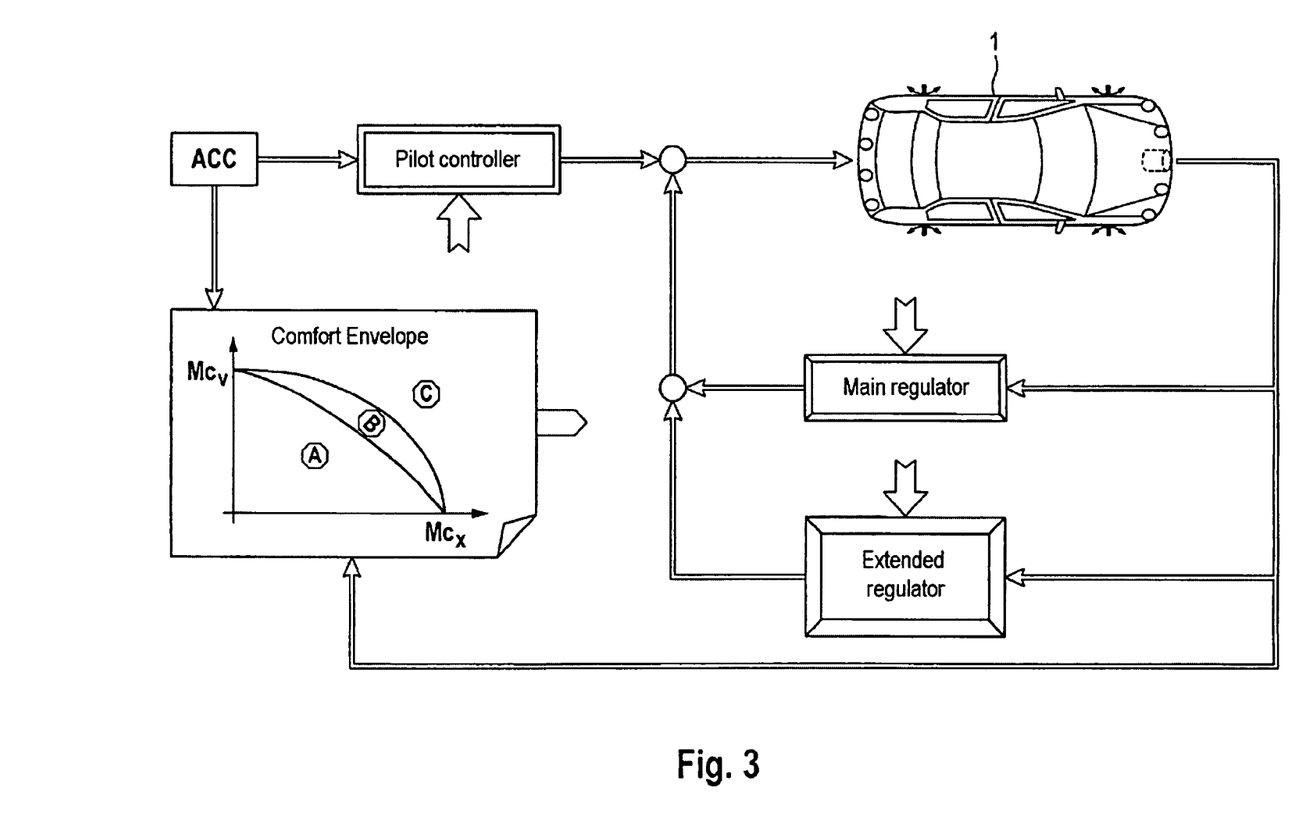
FIG. 3 shows an exemplary embodiment of the regulator structure.

FIG. 3 shows an exemplary embodiment of the regulator structure, which comprises three regulator components which are used for the reference variable regulation. The pilot controller realizes primarily the handover from the previously active ACC regulation function to the stopping distance regulation SDC. The main regulator thereafter performs the actual task of reference variable regulation and disturbance variable suppression. An extended regulator is also provided in order to ensure robustness with respect to parameter variations such as, for example, changes in vehicle mass, operation with a trailer, or road gradients. The setting of the comfort is performed with the aid of a "comfort envelope", which will be described in more detail below. It is expedient for all three regulator components to be connected to outputs of the "comfort envelope", and/or for at least one parameter of the respective regulator component to be adapted as a function of information from the "comfort envelope". Thus, in a preferred embodiment of the invention, the regulator of the SDC function has connected upstream thereof a "comfort envelope" which, as a function of the traveling speed and the target distance for the stopping process, outputs information as regards how comfortable stopping distance regulation can be realized.

For the subjective perception of the driver and of any further vehicle occupants, the comfort of a stopping process is assessed in terms of whether they feel jerk effects of the implementation. It is thus desirable for changes to take place as slowly, uniformly and continuously as possible. A braking operation implies a considerable change in the kinetic energy of the vehicle, which is converted into heat or preferably recuperated. Here, it must thus be ensured that, during the stopping process, the change in the kinetic energy does not exceed a value comfortable for the driver. Therefore, the comfort set during the stopping process is a function of jerk, which, as the change in the vehicle acceleration with respect to time, is the significant physical variable. The degree of comfort can thus be derived from the profile of the acceleration.

Figure 4:
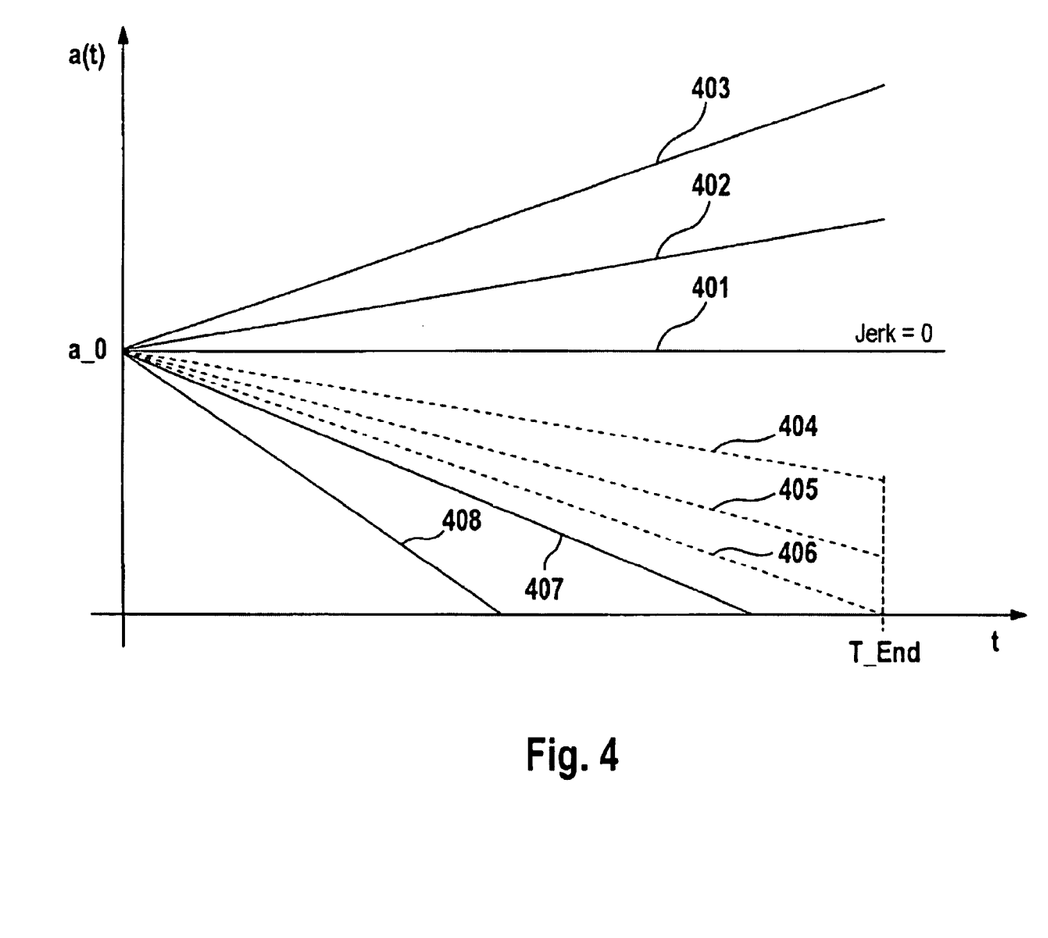
FIG. 4 shows a jerk diagram.

FIG. 4 shows a jerk diagram with a number of examples of time-dependent acceleration profiles, that is to say in which the braking acceleration or deceleration a(t) is plotted versus the time t. A constant acceleration a_0 represents the most expedient profile 401 from a comfort aspect because, in this case, a jerk of zero, or no jerk whatsoever, is generated. All the other acceleration profiles exhibit non-zero jerk. The jerk is greater the further the corresponding profile is from the line of constant acceleration. Thus, the jerk is considerably greater in the case of profile 403 than that in the case of profile 402.

Since, as part of the stopping distance regulation or the SDC function, the vehicle is braked proceeding from a non-zero initial speed, a non-zero braking deceleration is required, which must be decreased to zero during the stopping process. Thus, for the stopping distance regulation, an optimum acceleration profile is required which has a finite initial value that decreases to zero toward the end of the regulation. With regard to comfort, this solution entails an acceleration profile with non-zero jerk which remains either at or below the comfort limit and which is decreased continuously, so as to maintain comfort, during the regulation.

If a fixed time period T_End is predefined, such as is the case with a stop-and-go function according to the prior art, then constant jerk can be realized exactly with an acceleration profile 406 from a_0 to zero. However, not all real stopping processes can be covered by said acceleration profile, such that in most cases, there is a considerable step change in acceleration at the end of the stopping process. Such abrupt changes in acceleration, such as arise for example in the profiles 404 and 405, are very uncomfortable.

In accordance with the explanations above, in the region below the line 401 of constant deceleration a_0, there are an infinite number of acceleration profiles with the initial value a_0 and constant jerk. Said different profiles, of which two examples are illustrated as line 407 (low jerk) and line 408 (high jerk), differ substantially with regard to the time at which an acceleration of zero is attained. This means that, to achieve a comfortable stopping process which does not exceed a predefined jerk, it is not possible to predefine a fixed time period. Said region can therefore be taken into consideration for the realization of the SDC function because it is not a fixed time period but rather a target distance that is predefined for the ending of the stopping process. By combining the comfort-oriented demand for the least possible jerk with the demands on the vehicle speed and the stopping distance or the target distance, a suitable selection can be made from the multiplicity of possible acceleration profiles.

Figure 5:
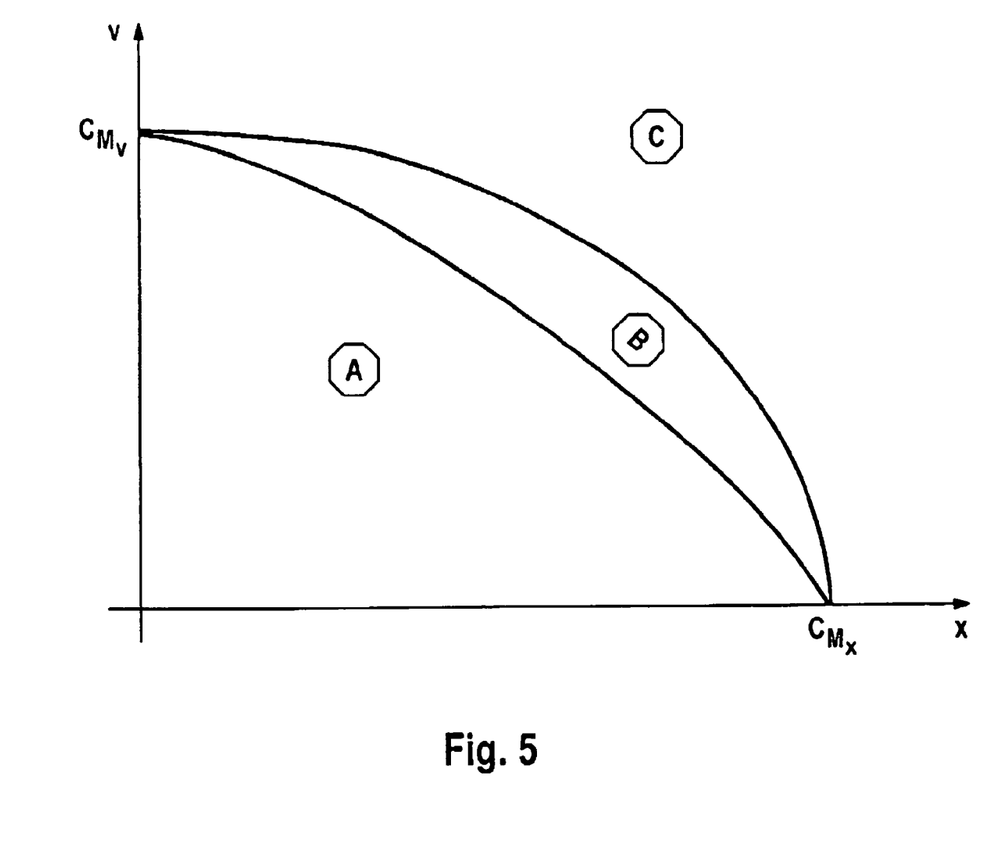
FIG. 5 shows a diagram of the comfort range.

FIG. 5 shows a diagram of the comfort region, also referred to as "comfort envelope". In this normalized speed-distance diagram, the stopping distance x in relation to the predefined target distance $^cM_x$ is plotted on the abscissa, and the traveling speed v in relation to the traveling speed $^cM_v$ at the time of the handover or at the beginning of the stopping process is plotted on the ordinate. The normalized diagram thus has two highlighted points as centers of the variety, because the speed $^cM_v$ at the beginning and the stopping distance $^cM_x$ at the end of the stopping process are the same for all possible stopping processes. The above-described region for a comfortable stopping process corresponds to the region, denoted by A, of the "comfort envelope", which is defined by the following mathematical inequation:

$$2v^2 + 3xa \geq 0$$

The stopping trajectory of the SDC regulation should be situated in said comfort region A; the inequation thus specifies the relationship between speed v, stopping distance x, and change with respect to time of the speed or (braking) acceleration a.

The region denoted as quasi-comfortable region B contains stopping trajectories that permit a certain degree of comfort even for a predefined stopping time. The combined regions A and B can be described by the following mathematical inequation:

$$v^2 + 2xa \geq 0$$

The transition to the region A lies in the direction of long fixed target time periods.

If it is necessary to achieve a short stopping distance in the case of a high traveling speed, then a considerable braking action and consequently also high jerk must be accepted. Such a braking process lies in the region C, in which the predefined comfort cannot be achieved.

In accordance with the defined regulation structure, the region of the "comfort envelope" in which the vehicle is situated is determined at all times during the stopping distance regulation. The result is evaluated and a suitable stopping trajectory and the necessary measures are determined such that, at all times, the stopping distance regulation takes place within the comfortable region A. The evaluation or the determined stopping trajectory is supplied to the components of the regulation structure, whereupon said components adapt parameters, for example.

Figure 6:
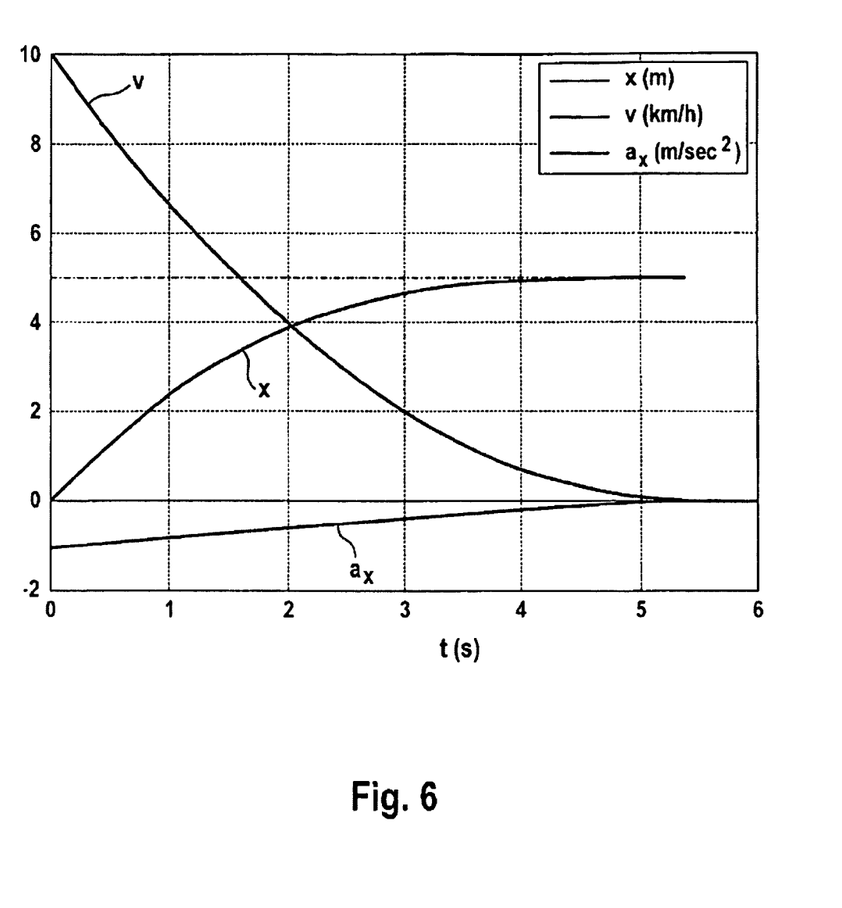
FIG. 6 shows a profile with respect to time of an exemplary stopping process.

FIG. 6 shows exemplary profiles with respect to time of the kinematic characteristic variables stopping distance x, speed v and the vehicle longitudinal acceleration $a_x$ during a comfortable stopping process. With the aid of the "comfort envelope", a suitable stopping trajectory is determined and the proximity to the region B or C is evaluated, and if appropriate, parameters of the regulator components are adjusted in order to maintain the comfort. The pilot controller, main regulator and extended regulator ensure that a standstill state is achieved at the end of the target distance.

By means of the invention, it is possible for considerably shorter separation distances to the vehicle traveling directly ahead or to a stationary object (including stationary vehicles) to be predefined in the stopping process and also during parking and to be realized down to a standstill. The implementation is performed automatically and is comfortable for all vehicle occupants. This firstly reduces the potential hazard posed by the large gap to the directly adjacent vehicle. Secondly, the inner-city traffic flow is positively influenced, and parking is made simpler, more precise and, above all, more comfortable.

The invention claimed is:

1. A method for stopping a motor vehicle that includes a surroundings control unit and a brake control unit, the method comprising:
   measuring, by the surroundings control unit including one or more surrounding sensors, a separation distance to an obstruction, in particular to a vehicle traveling ahead,
   determining, by the surroundings control unit, a traveling speed of the motor vehicle,
   regulating, by the surroundings control unit, the separation distance to the obstruction when the traveling speed exceeds a handover threshold value, and
   stopping the motor vehicle, by the brake control unit when the traveling speed is less than or equal to the handover threshold value,
   wherein, as a function of the measured separation distance, the surroundings control unit predefines for the brake control unit a target distance the motor vehicle travels at the end of which the vehicle should be stationary, and
   wherein the brake control unit adjusts the speed of the motor vehicle as a function of a traveling distance covered by the motor vehicle in order to stop the motor vehicle at the predefined target distance.

2. The method as claimed in claim 1, wherein the brake control unit, during the stopping process, regulates the deceleration and/or the traveling speed of the vehicle as a function of the traveling distance covered.

3. The method as claimed in claim 2, wherein the brake control unit is connected to at least one wheel rotational speed sensor, and in that, as a measure of the traveling distance covered, pulse-like signals from the at least one wheel rotational speed sensor are counted.

4. The method as claimed in claim 2, wherein the relationship between deceleration and/or traveling speed and the traveling distance covered is regulated on the basis of a predefined mathematical function, in particular a third-order to eighth-order polynomial.

5. The method as claimed in claim 4, wherein the predefined mathematical function is selected as a function of the traveling speed and a predefined target distance at the time of the handover from the first control unit to the second control unit.

6. The method as claimed in claim 4, wherein the predefined mathematical function is selected such that the relationship $2v^2+3xa \geq 0$ between traveling speed v and traveling distance covered x is satisfied, wherein a represents the deceleration, that is to say the change in the vehicle speed with respect to time.

7. The method as claimed in claim 1, wherein during the stopping of the motor vehicle by means of the brake control unit, a measurement of the separation distance to the obstruction is performed by the surroundings control unit, in particular at predefined time intervals, wherein the predefined target distance is adapted as a function of the measured separation distance.

8. The method as claimed in claim 7, wherein the stopping process is terminated if a restart of the vehicle traveling ahead is identified, in particular if the separation distance has increased by more than a predefined minimum separation distance in a time interval, and in that, in this case, separation-distance regulation is performed by the surroundings control unit.

9. The method as claimed in claim 1, wherein the motor vehicle has a hydraulic service brake system and an electrically actuable parking brake system, and in that a handover from the service brake system to the parking brake system is performed if predefined conditions are met, in particular if a predefined stoppage duration is exceeded.

10. An electronic control unit of a brake system for a motor vehicle, comprising:
    an interface to a vehicle data bus, an interface to at least one wheel rotational speed sensor, and
    means for driver-independent activation of at least one brake actuator, including:
    one or more surrounding sensors, for measuring a separation distance to an obstruction, in particular to a vehicle traveling ahead,
    a stopping distance regulator which, when the traveling speed is less than or equal to a handover threshold value, adjusts the deceleration and/or the speed of the motor vehicle as a function of the traveling distance covered by the motor vehicle in order to stop the motor vehicle at a predefined target distance the motor vehicle travels at the end of which the motor vehicle should be stationary.

11. The electronic control unit as claimed in claim 10, wherein the stopping distance regulator comprises a pilot controller and a main regulator, wherein at least one parameter of the stopping distance regulator is predefined as a function of the present speed of the vehicle and the predefined target distance.

12. The electronic control unit as claimed in claim 10, wherein the at least one parameter is predefined on the basis of a predefined mathematical function that describes the target relationship between deceleration and/or vehicle speed and the traveling distance covered.

13. A motor vehicle, comprising an electronic brake control unit as claimed in claim 10, further comprising a hydraulic and/or electromechanical brake system which is connected to the brake control unit and which permits a build-up of braking force independently of a driver, and comprising an electronic surroundings control unit which is equipped with at least one forward-facing surroundings sensor, wherein the brake control unit and the surroundings control unit are connected to one another via a vehicle data bus and carry out a method for stopping a motor vehicle which has an electronic surroundings control unit for evaluating the data from one or more surroundings sensors and which has an electronic brake control unit for activating a brake system, which electronics surroundings control unit and electronic brake control unit exchange information and/or commands via a data connection, in particular a vehicle data bus.

14. The motor vehicle as claimed in claim 13, wherein the brake control unit is connected to at least one rotation-direction-detecting wheel rotational speed sensor which is assigned in particular to a non-driven wheel.

15. The motor vehicle as claimed in claim 14, further comprising an electronic parking control unit which is equipped in each case with at least one forward-facing and at least one rearward-facing surroundings sensor, wherein the parking control unit is connected to the brake control unit and preferably to the surroundings control unit via a vehicle data bus, and wherein the parking control unit and/or the surroundings control unit can predefine for the brake control unit a target distance for the stopping of the vehicle.

* * * * *